June 16, 1959
C. R. KRONOFF
2,890,726
PICKER STICK GIVEWAY
Filed Feb. 10, 1958
2 Sheets-Sheet 1
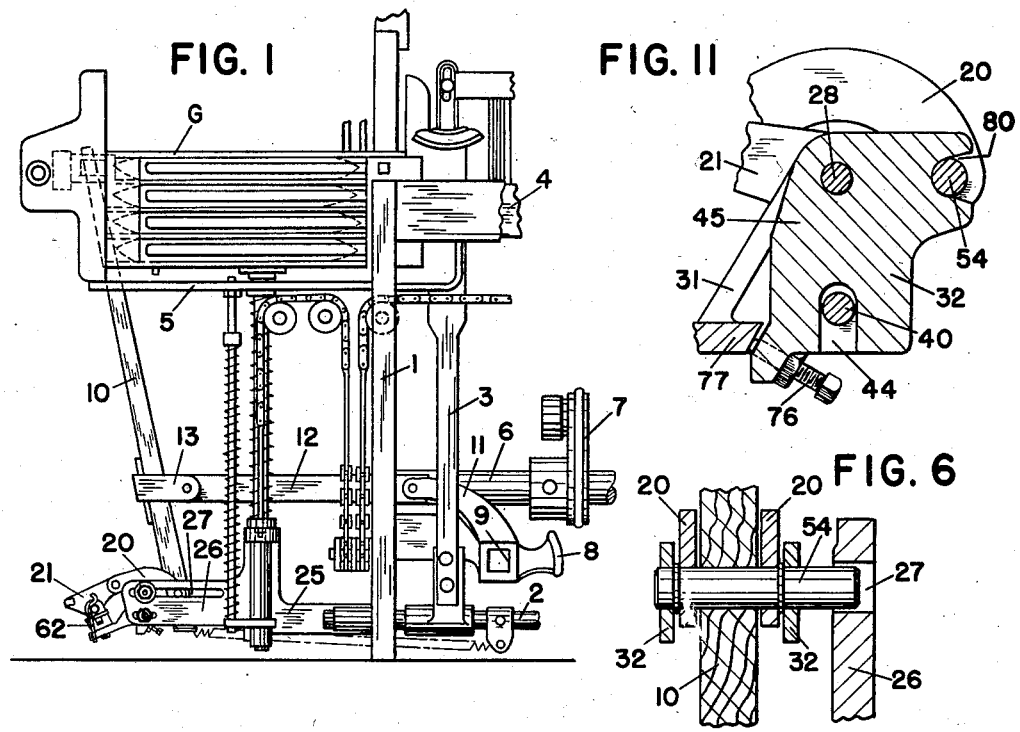
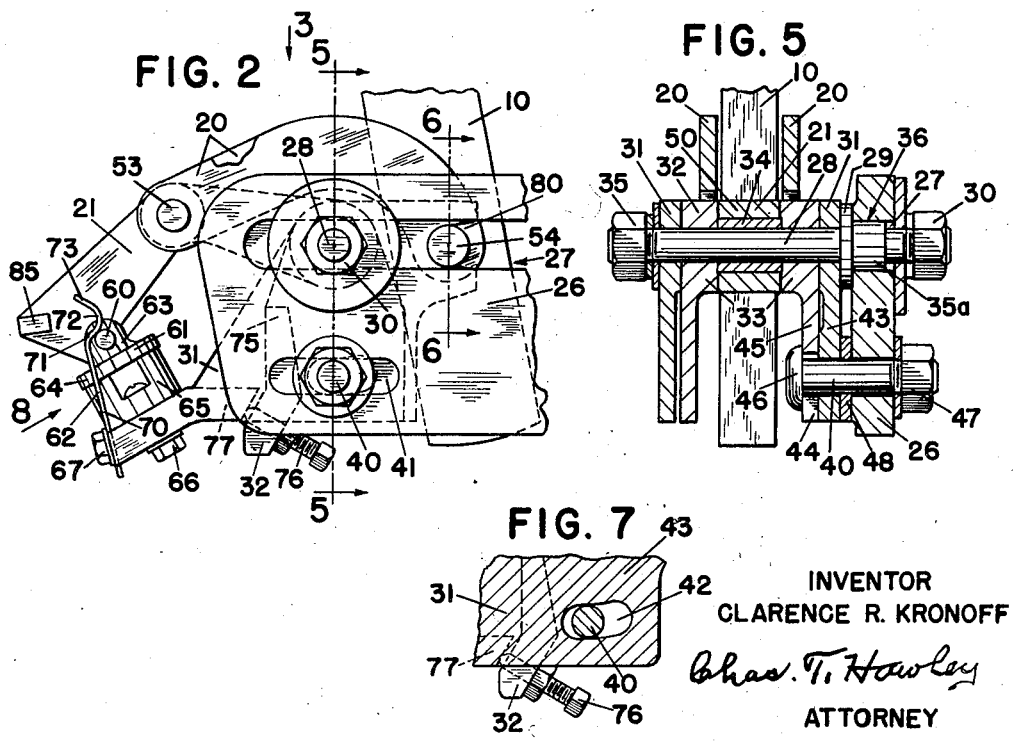
INVENTOR
CLARENCE R. KRONOFF
*Chas. T. Hawley*
ATTORNEY June 16, 1959 C. R. KRONOFF 2,890,726
PICKER STICK GIVEWAY
Filed Feb. 10, 1958 2 Sheets-Sheet 2
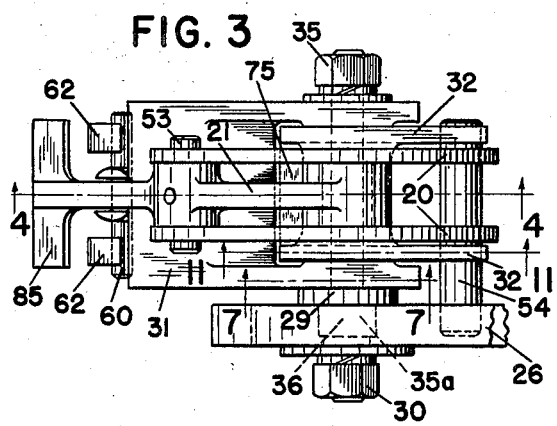
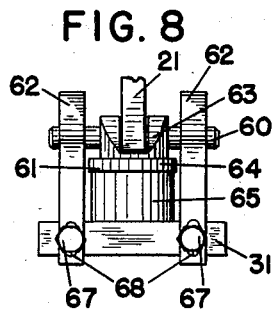
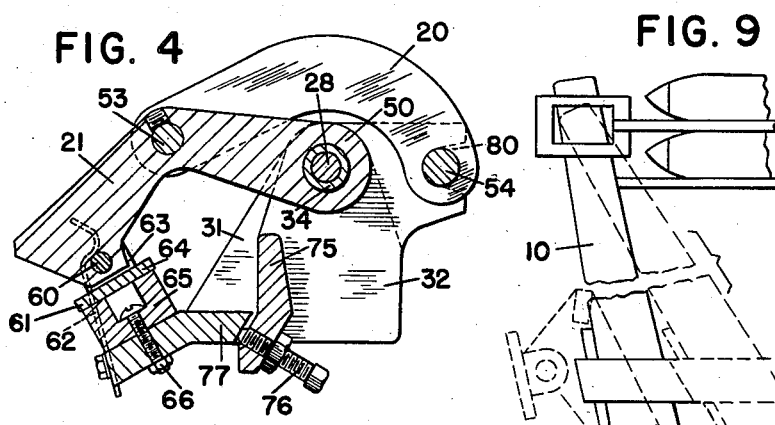
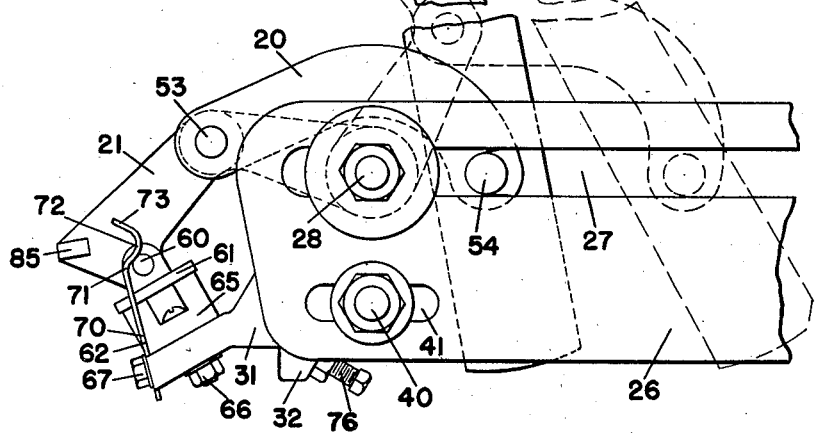
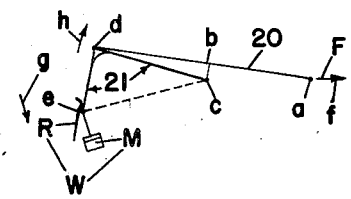
INVENTOR
CLARENCE R. KRONOFF
Chas. T. Hawley
ATTORNEY

United States Patent Office 2,890,726
Patented June 16, 1959

2,890,726
PICKER STICK GIVEWAY

Clarence R. Kronoff, Worcester, Mass., assignor to Crompton & Knowles Corporation, Worcester, Mass., a corporation of Massachusetts Application February 10, 1958, Serial No. 714,143

17 Claims. (Cl. 139—156)

This invention relates to yieldable mounting means for picker sticks in looms and it is the general object of the invention to provide mounting means of this type which shall be readily resettable.

The picker sticks of many looms swing around a pivot at their lower ends to propel the shuttle by their upper ends. In looms employing shifting shuttle boxes it sometimes happens that the box shift is imperfect so that the shuttle is not correctly positioned for picking and as a result the picker stick is broken. It has been proposed heretofore to correct this condition by providing a yieldable pivotal mounting for the stick which releases the stick and thus prevent its breakage, but such devices have been difficult to reset after release because of the strong springs generally employed for the yieldable jaws which hold the pivot stud in normal position.

It is an important object of the present invention to provide resisting means acting through a lever and link system to hold the stick pivot stud in normal position during normal picking operations, but yielding to permit movement of the stud to avoid stick breakage when an excess picking force occurs. The system is so made that a relatively small resisting force, partly at least resilient, can withstand the normal picking force, and it is only this small force which must be overcome when the system is reset after a releasing operation.

It is another object of the invention to combine magnetic and resilient forces in the resisting means in such a way that a slight amount of yielding by the pivot stud due to excessive force will produce an air gap at the magnetic means, thus greatly reducing the force which the latter can exert, whereupon the resilient means, not able of itself to withstand the excess picking force, yields readily to release the pivot stud.

It is a further object of the invention to make the resilient means in such a way that resetting can be accomplished by a simple pressing operation which at the same time reestablishes the magnetic means to normal position.

It is a still further object of the invention to provide a mounting for the aforesaid lever and link system which will permit adjustment of the resisting forces relative to the picking forces.

These and other objects will appear as an example of the invention as described in connection with the accompanying drawings in which:

Fig. 1 is a front elevation of one end of a shuttle box loom having the invention applied thereto, Fig. 2 is an enlargement of the lower left-hand part of Fig. 1, Fig. 3 is a plan view looking in the direction of arrow 3, Fig. 2, Fig. 4 is a vertical section on line 4—4, Fig. 3, Figs. 5 and 6 are vertical sections on lines 5—5 and 6—6 respectively, Fig. 2, Fig. 7 is a detail vertical section on line 7—7, Fig. 3, Fig. 8 is a detail end view looking in the direction of arrow 8, Fig. 2, Fig. 9 is a view showing the parts in normal position in full lines and in released position in dashed lines, Fig. 10 is a diagram illustrating the relation of the previously mentioned lever and link system with respect to the picker stick, and Fig. 11 is a vertical section on line 11—11, Fig. 3.

Referring to Fig. 1, the loom frame 1 supports a rocker shaft 2 which supports the layswords, one of which is shown at 3. A lay 4 is provided with a layend 5 on which a gang G of shuttle boxes shift vertically. The loom has a shaft 6 carrying a picking arm 7 which cooperates with a cam 8 on a picking shaft 9 to rock the latter periodically to give the upper end of a picker stick 10 a pivotal picking stroke to the right from the position shown. The force for moving the stick is derived from arm 7 and transmitted via cam 8, shaft 9, picking arm 11 on shaft 9, and sweepstick 12 to lug strap 13. When the gang G is properly placed the stick can propel a shuttle out of the box in active position, but if the gang G should be improperly placed the shuttle cannot be picked out of the active box and the stick 10 will be subjected to an excessive force which in all likelihood will break it. The matter thus far described and shown in Fig. 1 is of usual construction.

In the following description of the invention reference will first to made to Fig. 10 and the force relations of the inventions, after which the structures will be described.

In Fig. 10 $a$ is the point at which the picking force F is applied to the pivotal support of the picker stick in the direction of arrow $f$. The link 20 transmits this force to $d$ where the link is pivoted to a lever 21 which pivots about a fixed center $c$. The point at which the resilient resisting force R and the magnetic resisting force M are applied to lever 21 is designated at $e$. These resisting forces act in the direction of arrow $g$. The line $bc$ represents the effective length of an imaginary lever arm on which force F acts, and line $ce$ similarly represents the length of an imaginary lever arm through which resisting forces R and M act as a combined force W. When force F overpowers force W point $d$ moves in the direction of arrow $h$ around $c$.

From Fig. 10 it is apparent that a relatively large picking force can be balanced by a relatively small combined resisting force W to hold point $a$ stationary, a condition desired when the picking force F is normal. It is further apparent that if force W just balances force F as a normal condition, then an abnormal picking condition resulting in an increase in force F will cause a slight rocking of lever 21 which results in an air gap which greatly reduces the force M. Under these conditions force R will be readily overpowered and point $a$ will move to the right, thus relieving the picker stick of its excess force and preventing its breakage.

Referring now to the structures which these forces are exerted, the rocker shaft 2 has secured thereto a rocker iron 25 formed with a vertical plate 26 having a horizontal slot 27 therein. An upper stud 28 passes through slot 27 and has an integral collar 29, see Fig. 5, held against the left-hand side of plate 26 by a nut 30 which is screw threaded to the right-hand end of the stud. This stud corresponds to center $c$ in Fig. 10 and its left end passes through two yoke members 31 and 32, yoke 32 being a support member within member 31. Surrounding the stud 28 between the bearings 33 of member 32 is a spacing bushing 34. A nut 35 at the extreme left end of stud 28 when tightened clamps the yoke members and bushing against the collar 29. The yokes are therefore held in fixed position on the rocker iron, but can be slid along slot 27 to desired position by loosening nut 30. Stud 28 has an enlarged part 35a made with flat slabbed surfaces 36 to engage opposite sides of slot 27 to prevent turning of the stud when the nut 30 is tightened.

A lower stud 40 passes through a horizontal slot 41 in plate 26, see Figs. 1 and 2, and also passes through slot 42 arcuate around stud 28 in a vertical wall 43 of yoke member 31. Stud 40 extends through a vertical slot 44 in adjacent wall 45 of yoke member 32, see Fig. 11, and has a head 46 which engages wall 45 and clamps the yoke members and a spacing washer 48 firmly against plate 26 when nut on stud 40 is tightened. Slot 41 permits sliding of stud 40 horizontally when stud 28 is slid along slot 27, as already mentioned. Arcuate slot 42 provides for angular adjustment of yoke member 31 around stud 28 when nuts 30 and 47 are loosened.

The previously mentioned lever 21 has a bearing 50 which fits around and is freely rotatable on bushing 34. To the left of the bushing, Fig. 2, lever 21 has secured thereon a pivot pin 53 corresponding to point $d$, Fig. 10, and links 20 constituting link means have their left ends pivoted on this pin. The right-hand ends of the links as viewed in Fig. 2 support the pivotal mounting stud 54 for the lower end of the picker stick, see Fig. 6. This stud 54 has an end thereof extended into slot 27 to guide the stud during a release or giveway operation.

The left-hand end of lever 21 as viewed in Fig. 9 has secured thereto a stud 60 shown more particularly in Figs. 3 and 8. This stud extends to both sides of the lever 21 and serves the dual purpose of pivotally supporting a magnetic body 61 and cooperating with two leaf springs 62. The magnetic body 61 has a bearing 63 on each side of the lever 21, see Fig. 8, and has a flat bottom plate 64, the body 61 being pivotal on stud 60 to permit plate 64 to adjust itself for close contact with a permanent magnet 65 which is held by screw 66 on yoke member 31.

The leaf springs 62 are held to member 31 by screws 67 passing through slots 68 in the springs and tapped into member 31. Each leaf spring has a straight lower part 70 which leads at its upper end to a curved part 71 which in turn leads to a reverse curve 72. Above the latter curve the spring has a cam part 73 shown here as straight. The curved and cam parts of the springs are positioned to engage the opposite ends of stud 60 as shown in Figs. 3 and 8.

The previously mentioned adjustment is provided for as shown in Fig. 4. A cross wall 75 of yoke support member 32 has an adjustable stop screw 76 tapped into the lower end thereof for engagement with an abutment 77 on yoke member 31. The yoke member 32 has an open bearing 80 which receives the picker stick stud 54 and the latter is therefore able to prevent substantial angular motion of the yoke member 32 so long as it is in open bearing 80.

To make the adjustment nuts 35 and 47 are slackened while nut 30 remains tight and the parts will be so placed as to locate stud 54 in bearing 80. The screw 76 is then turned in the desired direction either to raise or lower the magnet 65, depending upon whether the forces resisting the picking force are to be reduced or increased. Raising the magnet 65, as an example of adjustment, acts through the magnetic member 61 to raise stud 60 and lift pivot 53 corresponding to a point $d$ in Fig. 10, thus increasing the length of lever arm $bc$. After the desired adjustment has been made the nuts 35 and 47 are tightened. The two yoke members and magnet 65 and springs 62 will then be held firmly in their new positions. If the resisting forces are to be increased, the screw 76 will be turned in the opposite direction and the lever 21 pushed down by means of the lateral wings 85 thereon, see Fig. 3.

In operation the parts will be in the full line positions shown in Fig. 9 so long as the picking force brought to bear on stud 54 is normal, and the picker stick will swing around stud 54 for a normal picking operation, the resisting force holding the parts in normal position. The resisting force is derived in part from engagement of stud 60 by the curved parts 71 of the springs 62 and in part by the attraction of magnet 65 for magnetic body 61. Neither the springs, nor the magnet, acting alone, is strong enough to resist a normal picking force, but acting jointly they are able to do so.

When a normal picking operation is prevented, as for instance when a shuttle is not aligned with the picker as shown in Fig. 9, an excessive force is exerted on stud 54 the first effect of which is to raise stud 60 slightly to lift body 61 away from the magnet. The resulting air gap greatly reduces the resistance exerted by the magnet and the springs, not of themselves being able to withstand the picking force, release the stud 60 and stud 54 is then free to move out of open slot 80 and along slot 27, causing the links to swing lever 21 to the dashed line position shown in Fig. 9. After the faulty condition of the shuttle position has been corrected downward pressure on wings 85 will return stud 54 to its normal position, and at the same time push the stud 60 against the cam parts 73 of the springs to deflect the latter with little effort to reestablish the stud and springs to normal position, and also reset body 61 against and in close contact with the magnet, where it will be held by the springs.

From the foregoing it will be seen that the invention sets forth a simple form of yielding mounting for picker stick wherein two forces jointly hold the picker stick pivot in correct position during a normal picking operation. Neither force, however, acting alone is able to hold the pivot stud 54 in position, and a slight increase in the picking force above normal causes a sudden reduction in one of the forces unaccompanied by any temporary increase in the force which it normally exerts. The magnet as shown herein is a means for exerting a force which can be greatly reduced when the excess picking force produces enough movement of the lever 21 to cause an air gap between the magnetic body 60 and the magnet 65. The leaf springs when deflected incident to a yielding operation will exert a slight increase in their normal holding force but this increase will be less than the force exerted by the magnet. The leaf springs by reason of the curves 71 therein act to hold the plate 61 against the magnet 65 thereby insuring a good metallic contact between these parts independent of any magnetic attraction between them. Also, when the mechanism is to be reset subsequent to a releasing operation the stud 60 engages the cam parts 73 of the leaf springs to deflect the latter momentarily by an operation which is easy for the weaver to perform.

Furthermore, the adjusting screw 76 affords means for adjusting the position of point or pivot $d$ in Fig. 10 for the purpose of varying the length of the imaginary lever arm $bc$. The lever 21 and link means 20 are operative connections between the stick pivot stud 54 and the resisting force exerting springs and magnet. During the latter part of the escape of stud 60 from the springs in release operation the cam parts 73 assist in pushing the stud upwardly as the springs recover their normal position.

I claim:

1. In shuttle picking mechanism for a loom operating with a picker stick, a yieldable pivotal mounting for the stick, two means each acting to exert a force independent of the force exerted by the other tending to maintain said mounting in normal position, the sum of said forces being sufficient to maintain the pivotal mounting in normal position when the stick is subjected to a normal picking force, neither means alone being able to exert a force sufficient to maintain the mounting in normal position during a normal picking operation, and a slight increase in the force to which the stick is subjected above said normal picking force causing the force exerted by one of said means to be greatly reduced without attendant temporary increase in the force exerted by said one of said means, whereupon the other means is incapable of maintaining the mounting in normal position and the mounting thereupon yields to prevent breakage of the stick.

2. The mechanism set forth in claim 1 wherein said one of said means includes a magnet.

3. The mechanism set forth in claim 1 wherein said one of said means includes two magnetic elements normally engaging each other, one of said elements being magnetized, and said slight increase in force causing an air gap between said elements.

4. In shuttle picking mechanism for a loom operating with a picker stick, a yieldable pivotal mounting for the stick, two means normally acting to exert forces which jointly are effective to maintain the mounting in position for normal picking conditions, neither means alone being able to do so, and one of said means including two elements normally magnetically engaging each other, an abnormal picking force causing an air gap between said elements which greatly reduces the force said one means can exert on the mounting, whereupon the other means is incapable of maintaining the mounting in normal position and the mounting thereupon yields to prevent breakage of the stick.

5. In shuttle picking mechanism for a loom operating with a picker stick, a yieldable pivotal mounting for the stick, two means normally acting to exert forces which jointly are effective to maintain the mounting in stationary normal position for normal picking conditions, neither means alone being capable of maintaining the mounting in normal position under normal picking conditions, one of said means being held magnetically in normal position and the other means being resilient, an abnormal picking force acting on said pivotal mounting acting to develop an air gap at said one means which greatly reduces the force it can exert on the mounting, whereupon the resilient means is overpowered and is incapable of maintaining the mounting in normal position and the mounting thereupon yields to prevent breakage of the stick.

6. The mechanism set forth in claim 5 wherein said one means includes two magnetic elements normally engaging each other one of which is a permanent magnet.

7. The mechanism set forth in claim 5 wherein the resilient means acts normally independently of the magnetic means to hold said two elements in metallic engagement with each other.

8. The mechanism set forth in claim 5 wherein the resilient means when being overpowered exerts an increased force due to deflection thereof but the amount by which the increased force exceeds the force normally exerted by the resilient means is less than the force exerted by the magnetic means.

9. In shuttle picking mechanism for a loom operating with a picker stick, a support providing an open bearing opening in the direction in which the stick moves on a shuttle picking stroke thereof, a pivot for the picker stick in said open bearing, two means, one resilient and one magnetic, operative connections between said pivot and said two means, the latter normally exerting forces through said connections which jointly are effective to maintain the pivot in normal position in said open bearing under normal picking conditions, an abnormal picking condition developing an air gap at said magnetic means which greatly reduces the force exerted thereby, whereupon the other means is incapable of maintaining the pivot in said bearing and the pivot thereupon moves out of said bearing to prevent breakage of the stick.

10. The mechanism set forth in claim 9 wherein the magnetic means includes two magnetic bodies one of which is fixed with respect to said support and the other of which is movable with said operative connections, said bodies normally engaging each other and at least one of them being magnetized.

11. The mechanism set forth in claim 9 wherein the operative connections include a movable stud and the resilient means includes a leaf spring one end of which is fixed with respect to said support, said leaf spring having a curved part which engages the stud and normally resists movement of the stud and pivot but is bendable away from the stud to permit movement thereof and the pivot.

12. The mechanism set forth in claim 9 wherein the operative connections include a movable stud and the resilient means includes two leaf springs engaging the stud at two points spaced along its length, and the magnetic means includes a magnetic element mounted on the stud between said springs and a magnet fixed with respect to said support.

13. The mechanism set forth in claim 12 wherein the stud is mounted to move upwardly when the pivot yields and the leaf springs have bent parts which overhang the stud and have other parts extending upwardly from the first parts away from the stud to provide inclined cams which are deflected by the stud to permit engagement thereof with said first parts when the stud is reset by downward movement thereof.

14. The mechanism set forth in claim 13 wherein said other parts act to cam the stud upwardly when the pivot yields.

15. In shuttle picking mechanism for a loom operating with a picker stick, a support providing an open bearing opening in the direction in which the stick moves on a picking stroke thereof, a pivot for the stick in said bearing tending to move out of said bearing on a picking stroke of the stick, a lever mounted for pivotal movement with respect to the support, link means carrying said pivot pivoted to the lever, a magnet fixed with respect to the support, a magnetic body on said lever normally attracted to said magnet, and resilient means on the support normally acting to prevent movement of the lever relative to said support, the magnet and resilient means normally jointly exerting forces which prevent movement of the lever and link means during normal picking strokes of the stick to maintain said pivot in said open bearing, an abnormal picking stroke causing said magnetic body to move away from the magnet, thereby reducing the force exerted by the magnet on the lever, whereupon the resilient means is incapable of resisting movement of the lever and the link means and the pivot thereupon moves out of the open bearing to prevent breakage of the stick.

16. The picking mechanism set forth in claim 15 wherein means are provided to adjust the position of the magnet and resilient means with respect to the support to vary the relation of the forces of the magnetic and resilient means tending to resist movement of the lever with respect to the normal picking force.

17. In a rocker iron for the rocker shaft of a loom operating with a picker stick having a pivot stud, link means supported by the rocker iron for attachment to the stud, a lever pivotally mounted with respect to the rocker iron, two means supported by the iron normally exerting forces which jointly coact to hold the lever in normal fixed position with respect to the rocker iron, one of said means including a magnetic body fixed with respect to the rocker iron and a second magnetic body normally engaging the first body and operatively connected to said lever and movable relative to said iron, one of said bodies being a magnet, the other means being resilient and having one end thereof fixed with respect to the rocker iron and having the other end thereof operatively related to the lever but capable of flexure to a nonoperative position relative to the lever by a force which is less than the force by which the magnet attracts the magnetic body.

References Cited in the file of this patent

FOREIGN PATENTS 459,050    Italy _____ Aug. 23, 1950